United States Patent
Matsumoto et al.

(10) Patent No.: US 6,507,152 B2
(45) Date of Patent: Jan. 14, 2003

(54) MICROWAVE/DC CYCLOTRON WAVE CONVERTER HAVING DECREASED MAGNETIC FIELD

(75) Inventors: Hiroshi Matsumoto, Kyoto (JP); Vladimir A. Vanke, Kyoto (JP); Naoki Shinohara, Kyoto (JP)

(73) Assignee: Kansai Technology Licensing Organization Co., Ltd., Kyoto (JP)

( * ) Notice: Subject to any disclaimer, the term of this patent is extended or adjusted under 35 U.S.C. 154(b) by 0 days.

(21) Appl. No.: 09/902,668

(22) Filed: Jul. 12, 2001

(65) Prior Publication Data

US 2002/0060527 A1 May 23, 2002

(30) Foreign Application Priority Data

Nov. 22, 2000 (JP) ......................... 2000-355358

(51) Int. Cl.[7] ......................... H01J 25/02; H01J 25/00
(52) U.S. Cl. ......................... 315/5; 315/3.5; 315/500
(58) Field of Search ................... 315/500–507, 315/5, 3.6, 4; 313/62, 231.31, 359.1

(56) References Cited

U.S. PATENT DOCUMENTS

| 3,434,678 A | 3/1969 | Brown et al. ......... 307/151 |
| 3,462,636 A | 8/1969 | Seunik et al. ......... 315/5 |
| 3,781,647 A | 12/1973 | Glaser ......... 322/2 |
| 3,916,246 A | * 10/1975 | Preist ......... 315/5 |
| 4,422,045 A | * 12/1983 | Barnett ......... 330/4 |

FOREIGN PATENT DOCUMENTS

RU        2119691 C1      9/1998

OTHER PUBLICATIONS

Watson D.C. et al., "A Cyclotron Wave Rectifier for S–Band and X–Band", J. Microwave Power, 1970, col. 5, No. 2, p. 72.
Bardenkov V. A. et al., "Microwave Power Converter with Reversed Magnetic Field", Radiotechnique & Electronics, 1976, vol. 21, No. 4, p. 821.
Vanke V. A. et al., "On Some Microwave Physics Research at Moscow State University and Russian Industries" (PlenaryTalk), 23rd IEEE International Conference on Plasma Science, Boston, Jun. 3–5, 1996, Abstracts, pp. 62, 226.
Vanke V. A. et al., "Cyclotron Wave Converter of Microwaves into DC", IEICE Trans. On Electronics (Japan), 1998, vol. E81–C., No. 7, p. 1136.

* cited by examiner

*Primary Examiner*—Don Wong
*Assistant Examiner*—Wilson Lee
(74) *Attorney, Agent, or Firm*—Oliff & Berridge, PLC

(57) ABSTRACT

A microwave/DC converter employing fast cyclotron wave of the electron beam. Coupling section for feeding energy into the electron beam contains two microwave cavities 3, 7. The second cavity 7 has a group of 2n (where n=2, 3, ... ) rod electrodes aligned symmetrically in parallel around the axis for giving the electron beam a rotational movement around the axis according to the microwave power P and receives the electron beam already slightly modulated by the first cavity 3, which is a resonant coupler with uniform transverse electric field and operates at 1/n-th of the second resonant cavity frequency (attached Figure shows the case of n=2). For the effective interaction in both cavities 3, 7 uniform static magnetic field corresponds to the cyclotron frequency equal to a half of external microwave power source frequency. Asymmetrically reversed magnetic field is used between microwave cavities and collector to achieve the maximal efficiency of the microwave energy conversion into DC energy. Additional electrode 9 of the collector 11 creates a potential distribution providing converter with an effective protection against secondary emission influence.

5 Claims, 3 Drawing Sheets

MICROWAVE/DC CYCLOTRON WAVE CONVERTER HAVING DECREASED MAGNETIC FIELD

The present invention relates to microwave/Direct Current (DC) power converters employing fast cyclotron wave of the electron beam. The microwave/DC power converters may be used as a receiver in a microwave energy transmission (MET) system or a wireless power transmission (WPT) system.

BACKGROUND OF THE INVENTION

In connection with successful developing ideas of WPT during the last several decades, there appeared a new problem, namely, the problem of back conversion of high power microwave energy into the energy of direct current (DC). It is not impossible that in future microwave technology will find its wide scale application in this field.

Well-known rectennas (rectifying antennas) with Schottky-diodes have played and play a fundamental role at the stage of principal demonstration of the possibilities of highly efficient wireless power transmission by microwaves. However, they become not so attractive for future real high power industrial WPT systems, because of some essential problems as:

low power level of single rectenna element;
  low output voltage and therefore, necessity to connect diodes in series; and
  high level of breakdown possibility being dangerous even at rather small levels of microwave or DC overloads.

Industrial energy systems always demand and use high power and high voltage devices to decrease losses and to increase reliability.

The most studied cyclotron wave converter (CWC) is shown in FIG. 3A (Vladimir A. Vanke et al., "Cyclotron Wave Converter of Microwaves into DC", IEICE Trans. on Electronics (Japan), Vol. E81-C (1998), No. 7 (July), p.1136). The CWC 30 comprises an electron gun 31, a microwave cavity 32, a collector 33 and a transition space 34 aligned on the z-axis. The microwave cavity 32 usually called "Cuccia coupler" includes a gap of interaction and is subjected to a static and uniform magnetic field with the magnetic flux density B1 in the direction of z created by an external static magnetic field generator (not shown). The transition gap 34 is subjected to another external static magnetic field with the magnetic flux density B2 in the direction of -z.

When microwave power P of frequency F is input into the microwave cavity 32 of the CWC 30, the microwave power P creates a transverse electric field alternating at the frequency F in the interaction gap 35 of the microwave cavity 32. As the electron gun 31 generates a flow of electrons and the electron beam is sent into the center of the interaction gap 35 by an electron lens, the electron beam rotates at the frequency F (equal to the cyclotron frequency Fc) due to the alternating transverse electric field in the gap 35.

In the transition region 34, the rotating electron beam receives additional Lorenz forces due to existing of the radial component of the reversed static magnetic field (z1<z<z2 in FIG. 3B) and because of it the tangential component of the velocity of the electron beam decreases and the z component of the velocity of the electron beam increases.

The z-accelerated electron beam 36 enters the collector 33, where the kinetic energy of the electron beam is extracted as a DC power in the load-resistance 37.

CWC is potentially powerful and already tested at power level of 10 kW, which is rather well known from the previous different publications, in particularly from patents U.S. Pat. No. 3,462,636 and RU 2,119,691.

However, such type of CWC demands high intensity of static magnetic field that corresponds to the cyclotron frequency equal to the frequency of external microwave power source. This requirement usually creates essential technical problems, especially in the short centimetric and millimetric wavebands.

SUMMARY OF THE INVENTION

The present invention uses two microwave cavities having uniform and 2n-pole (where n=2, 3, . . . ) electric fields in the interaction gaps, which makes it possible to reduce the magnetic field intensity into half (if n=2) or less.

According to the present invention, a microwave/DC power converter includes: an electron source for generating a beam of electrons running on an axis; a group of 2n (where n=2, 3, . . . ) rod electrodes aligned symmetrically in parallel around the axis for receiving an externally supplied microwave power and for giving the electron beam a rotational movement around the axis according to the microwave power; and a converter for converting the energy of the movement of the electron beam into the energy of a DC current.

In a second form of the present invention, a microwave/DC power converter includes: an electron source for generating a beam of electrons running on an axis; a first microwave cavity for giving the electron beam an initial rotational movement; a second microwave cavity including a group of 2n (where n =2, 3, . . . ) rod electrodes aligned symmetrically in parallel around the axis for receiving an externally supplied microwave power and for giving the electron beam a cyclotron movement around the axis according to the microwave power; a kinetic converter for converting the cyclotron movement of the electron beam into an axial movement; and a current converter for converting the energy of the axial movement of the electron beam into the energy of a DC current.

In the above microwave/DC power converter, the first microwave cavity may preferably include a phase shifter for adjusting a phase of a rotational position of the electron beam with respect to the rod electrodes when the electron beam enters the second microwave cavity.

The microwave/DC power converter may further include a resistance, which is provided between the electron source and both the first microwave cavity and the second microwave cavity in order to prevent an over current.

The microwave/DC power converter may further include an auxiliary electrode provided before the current converter, where a voltage applied on the auxiliary electrode is set slightly lower than a voltage applied on the current converter.

Since, in the microwave power converter of the present invention, the interaction of the electric field and the electron beam is operated at the cyclotron frequency one n-th of that of conventional converters, the static magnetic field can be substantially reduced. It makes possible to create a compact, powerful and efficient microwave/DC power converter.

DRAWING DESCRIPTIONS

The invention will be better understood from a consideration of the ensuing description and attached Figures in which.

DESCRIPTION OF PREFERRED EMBODIMENTS

Figure 1A:
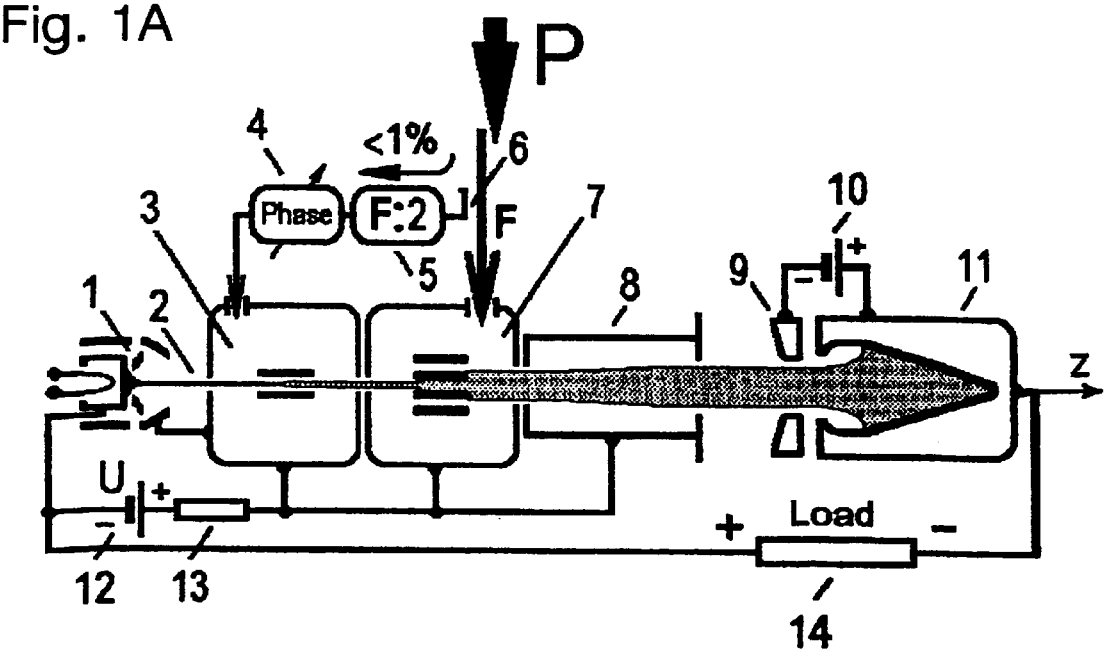
FIG. 1A is a schema of an embodiment of the microwave/DC power converter according to the present invention.
Figure 1B:
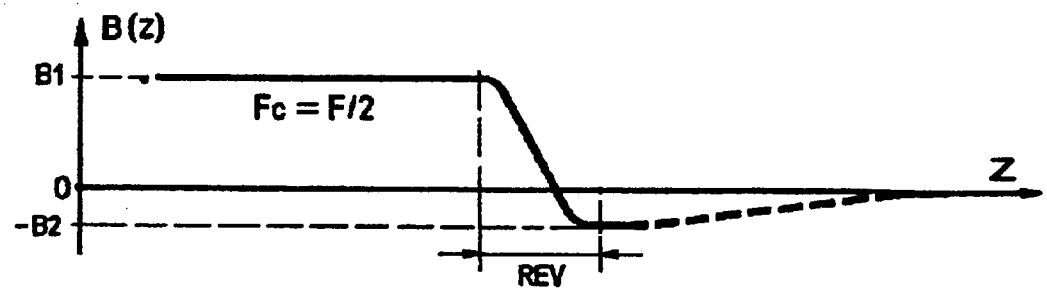
FIG. 1B is a graph of the z component of the magnetic flux density on the z-axis.

FIG. 1A illustrates a schematic view of a CWC embodying the present invention, and FIG. 1B is a graph of B(z) or the z component of the magnetic flux density on the z-axis which corresponds to that in FIG. 1A. Fc denotes the cyclotron frequency corresponding to B(z). An electron gun 1 forms an electron beam 2 of a round cross section, which is injected along the z-axis into a first microwave cavity 3 having a potential U equal to the potential of the voltage source 12, because, at the normal operational mode, the current in resistor 13 is absent.

The first microwave cavity 3 has a resonant frequency equal to a half of the frequency F of the incoming power microwave P. A small part (<1%) of the microwave power P is split by the power splitter 6, and is fed via a frequency divider 5 and a phase shifter 4 to the first microwave cavity 3. Transverse electric field in the interaction gap of the first microwave cavity 3 in combination with the resonant static and uniform magnetic field (Fc=F/2, see FIG. 1B) creates a small initial rotation of the electron beam around the z-axis.

In the interaction gap of a second microwave cavity 7 are placed four rod electrodes (quadrupole electrodes) in parallel with each other and symmetrically with respect to the z-axis. The quadrupole electrodes are applied the most part of the microwave power P having the frequency F. Since there are two pairs of electrodes in the quadrupole region, the resonance condition is Fc=F/2. Thus the operation frequency of the first microwave cavity 3 is also F/2. When 2n rod electrodes are placed similarly in the second microwave cavity 7, the operation frequency of the first microwave cavity 3 is F/n and the resonant cyclotron frequency is Fc=F/n.

In the same magnetic field (Fc=F/2), such an electric field in the quadrupole electrodes can accelerate or decelerate the transverse rotation of the electron beam depending on the initial (incoming) phase of the rotation. A phase shifter 4 makes it possible to set the initial phase at an optimal position at which the initial radius of the rotation will increase and energy of external microwave source will be effectively converted into the energy of electron beam rotation around the z-axis.

A drift tube 8 has the same potential U (see FIG. 1A), but the static magnetic field is changed here in both the direction and the magnitude (region "REV" in FIG. 1B). The z component of the velocity of the rotating electron beam is increased in the divergent magnetic field of this region. The radial component of static magnetic field creates the process when the energy of the rotational movement of the electron beam is transferred into the additional energy of the z directional motion. Simultaneously, the electron beam configuration is changed: it takes the shape of a spatial helix (energy of fast cyclotron wave is transferred into the energy of synchronous wave of the same polarization). It is important to emphasize that optimal energy conversion in this region "REV" takes place always in asymmetrically reversed magnetic field (value of B2 is less than that B1 in FIG. 1B) for any real technical parameter of CWC.

After the region "REV", the accelerated electron beam enters the collector region 11, where its kinetic energy is extracted and transformed into DC energy which appears at the load resistance 14. The magnetic field distribution here depends on a concrete collector construction, and usually has a shape of decreasing field, as it is shown approximately in FIG. 1B by the dashed line. An additional electrode 9 is fed by voltage source 10, and has a potential a bit lower than the potential of the collector 11. This additional electrode 9 creates a local electric field just at the collector orifice, which protects against outcoming of the secondary emitted electrons.

Resistor 13 creates a simple current limiting system. Any small current (caused by microwave or DC overloads) to the walls of the first microwave cavity 3, the second microwave cavity 7 and the drift tube 8 will drop their potential essentially, and decrease of the electron gun current.

Figure 2:
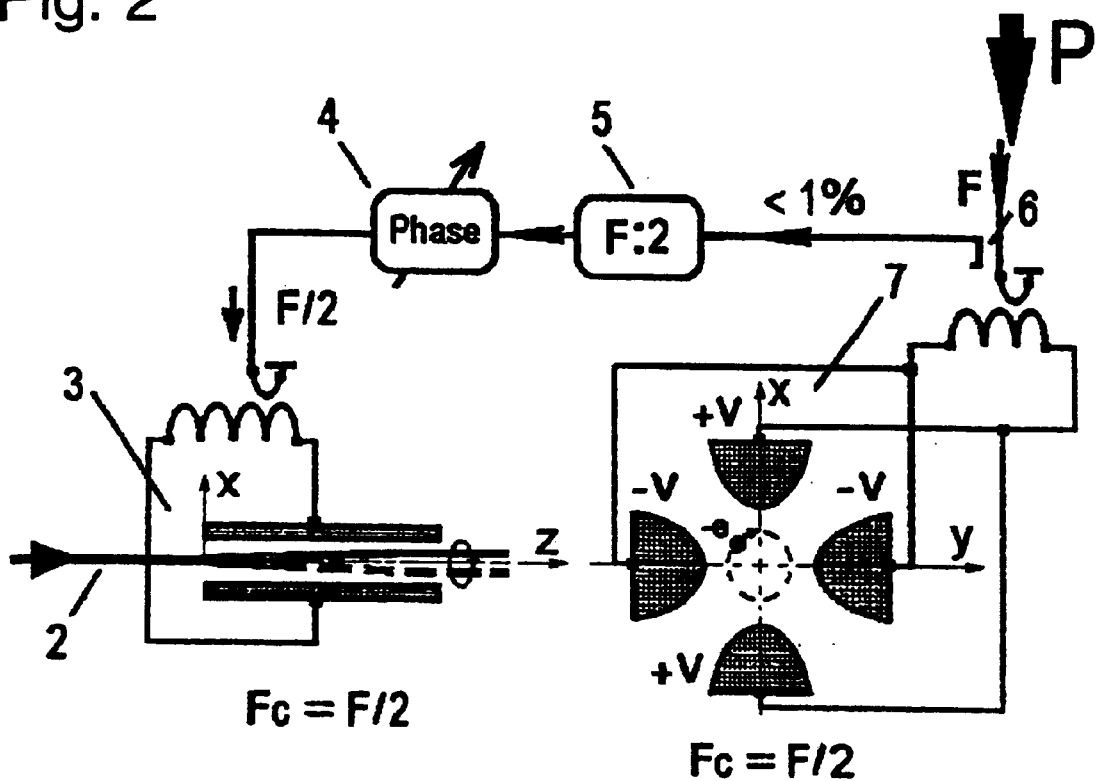
FIG. 2 is an equivalent schema of the microwave cavities in the case of n=2 (i.e., quadrupole electric field in the second cavity) of the microwave/DC power converter of the above embodiment.
Figure 3A:
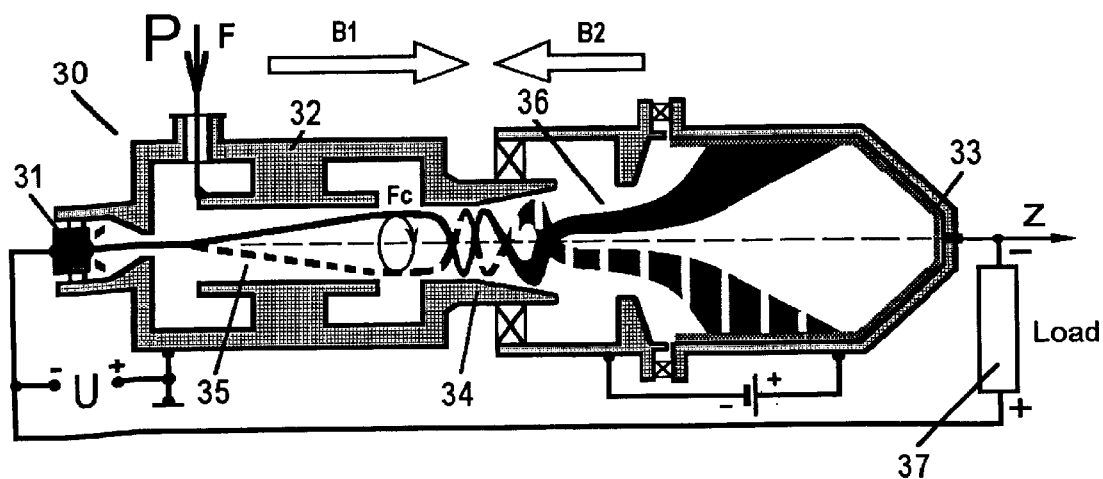
FIG. 3A is a schema of a conventional cyclotron wave converter.
Figure 3B:
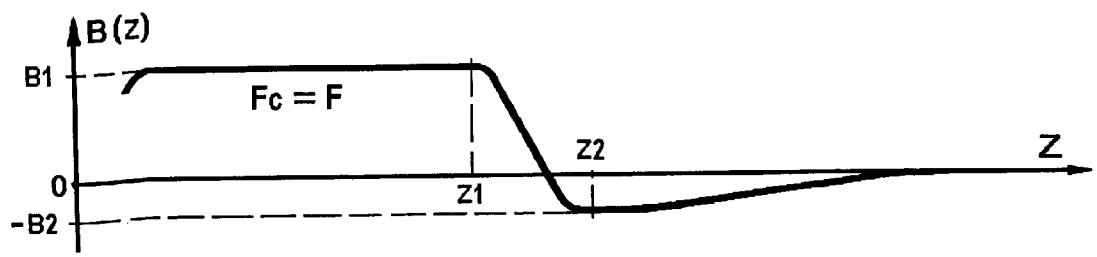
FIG. 3B is a graph of the z component of the magnetic flux density on the z-axis of the conventional CWC.

FIG. 2 shows an equivalent schema of the microwave cavities 3 and 7. The interaction gap of the first microwave cavity 3 is shown along the z-axis (y=0 plane), and the quadrupole interaction gap of the second microwave cavity 7 is given as a picture across the z-axis (z=const plane). The first and the second microwave cavities 3 and 7 have different resonant frequencies, different electrode configuration, different equivalent capacities and inductivities. The first microwave cavity 3 creates a small initial rotation of the electron beam at the frequency equal to F/2. Such initial rotation is necessary for the interaction in the second microwave cavity 7 having electric field intensity equal to zero at the axis of the quadrupole field. FIG. 2 shows the electrode potentials +V, −V at some fixed moment of time. A cross section of the electron beam is shown as a bold black point "−e", and corresponds to the optimal phase (y=−x for the center of this beam cross section). The adjustment of the position of the electron beam to the optimal phase can be made by the phase shifter 4. The motion trajectory of the beam cross section is, as shown in FIG. 2 by the dashed line, a circle.

Finally the invention covers all other variant embodiments open to any person skilled in the art and deriving from that described hereinbefore. As an example, a CWC having the second microwave cavity with six-pole electric field configuration (i.e., n=3) in combination with the first microwave cavity operating at the frequency equal to ⅓ of the frequency of the second one will have magnetic field reduced to a third and so on.

What is claimed is:

1. A microwave/DC power converter comprising: an electron source for generating a beam of electrons running on an axis; a group of 2n (where n=2, 3, . . . ) rod electrodes aligned symmetrically in parallel around the axis for receiving an externally supplied microwave power and for giving the electron beam a rotational movement around the axis according to the microwave power; and a converter for converting the energy of the movement of the electron beam into the energy of a DC current.

2. A microwave/DC cyclotron wave converter comprising: an electron source for generating a beam of electrons running on an axis; a first microwave cavity for giving the electron beam an initial rotational movement; a second microwave cavity including a group of 2n (where n=2, 3, . . . ) rod electrodes aligned symmetrically in parallel around the axis for receiving an externally supplied microwave and for giving the electron beam a cyclotron movement around the axis according to the microwave; a kinetic converter for converting the cyclotron movement of the electron beam into an axial movement; and a current converter for converting the energy of the axial movement of the electron beam into the energy of a DC current.

3. The microwave/DC power converter according to claim 2, wherein the first microwave cavity includes a phase shifter for adjusting a phase of a rotational position of the electron beam with respect to the electric field created by the rod electrodes when the electron beam enters the second microwave cavity.

4. The microwave/DC power converter according to claim 3, wherein the microwave/DC power converter further comprises a resistance provided between the electron source and both the first microwave cavity and the second microwave cavity for preventing an over current.

5. The microwave/DC power converter according to claim 3, wherein the microwave/DC power converter further comprises an auxiliary electrode provided before the current converter, where a voltage applied on the auxiliary electrode is slightly lower than a voltage applied on the current converter.

* * * * *